United States Patent Office 2,847,255
Patented Aug. 12, 1958

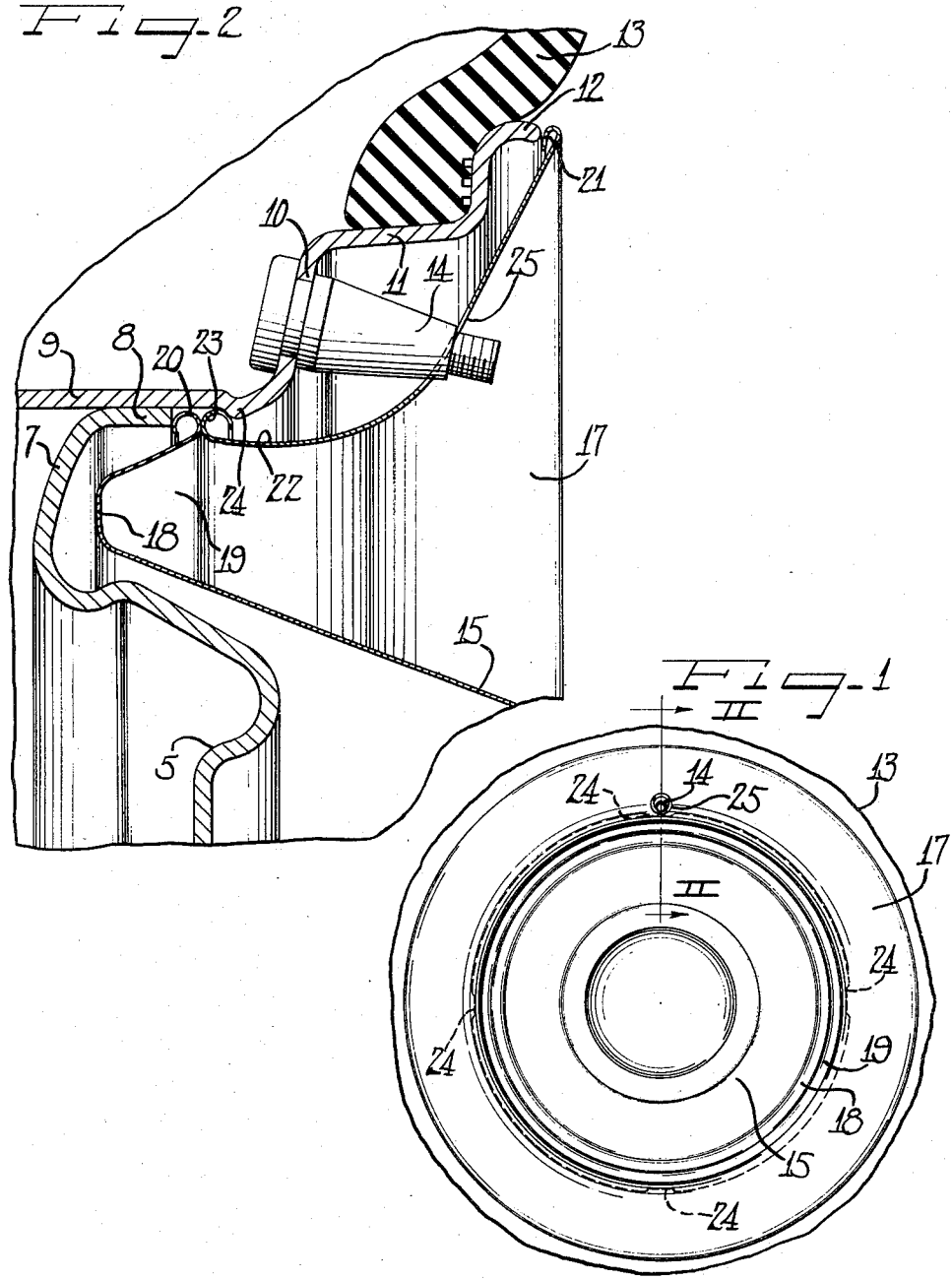

2,847,255

WHEEL COVER

George Albert Lyon, Detroit, Mich.

Application April 26, 1955, Serial No. 504,016

12 Claims. (Cl. 301—37)

The present invention relates to improvements in wheel structures and more particularly concerns the ornamental and protective covering of the outer sides of vehicle wheels.

An important object of the present invention resides in the provision of an improved wheel structure wherein provision is made for a cover that has an unusually deeply drawn appearance, that is, the cover is provided with radially inner and outer portions with an intermediate deeply inwardly dished annular portion therebetween and affording the appearance of great depth.

Another object of the invention is to provide improved means in a wheel structure for retaining a cover on the wheel.

A further object of the invention is to provide an improved wheel cover assembly for disposition at the outer side of a vehicle wheel.

Other objects, features and advantages of the present invention will be readily apparent from the following detailed description of a preferred embodiment thereof taken in conjunction with the accompanying drawing, in which:

Figure 1 is an outer side elevational view of a vehicle wheel embodying features of the invention; and Figure 2 is an enlarged fragmentary radial sectional view taken substantially on the line II—II of Figure 1.

The present invention is concerned with providing a wheel cover for the outer side of a vehicle wheel that has a wheel body 5 of the disk-spider type provided with an annular outer marginal deeply dished portion 7 at the radially outer side of which is an axially outwardly projecting annular attachment flange 8. Secured in suitable manner to the attachment flange 8 is a base flange 9 of a multi-flange tire rim having an outer side flange 10 projecting generally radially and axially outwardly from the outer side of the base flange and joining an intermediate radially inwardly facing flange 11 from which extends radially outwardly and then turned axially outwardly a terminal flange 12. The flanges of the tire rim are constructed and arranged to support a pneumatic tire 13 which as shown herein may be of the tubeless type or it may be a tube and tire combination. For inflating the tire, a valve stem 14 is provided which is mounted in the present instance on the side flange 10 and projects generally axially outwardly.

Since the inwardly dished annular portion 7 of the wheel body extends well in toward or adjacent to the medial plane of the wheel, a deep annular recess is afforded adjacent to the tire rim. Herein this deep recess is utilized for projection thereinto of a portion of a cover assembly. To this end, a cover assembly is provided which includes an inner crown cover member 15 and a radially outer annular trim ring cover member 17.

The inner crown cover member 15 is dimensioned to overlie the wheel body 5 and has its side wall sloping axially inwardly and radially outwardly to a narrow annular radially outwardly turned dished flange portion 18 which is dimensioned to extend well down into the groove afforded by the dished annular cover portion 7. At its radially outer side, the dished flange portion 18 of the cover member has a generally radially and axially outwardly extending marginal flange portion 19 provided with an outer turned edge portion 20 herein preferably in the form of an underturned annular reinforcing bead 20 adapted to shoulder against the axially outwardly directed edge of the wheel body marginal flange 8. Thereby, in assembly with the wheel, the cover member 15 is supported by seating of the turned edge bead 20 thereof against the edge of the flange 8 of the wheel body.

According to the present invention, the inner crown cover member 15 is held in place in assembly with the wheel by the outer annular cover member 17. To this end, the outer annular cover member 17 extends from an outer turned reenforcing and finishing edge 21 generally radially and axially inwardly in spaced relation to the tire rim flanges and is provided at its inner margin with a generally axially inwardly extending annular flange portion 22 which is provided with a turned annular terminal bead 23 of a diameter to rest in assembly upon the turned bead edge structure 20 of the inner cover member to thereby afford the appearance of being substantially a continuation of the marginal flange 19 of the inner cover member when the cover assembly is viewed from the outer side of the wheel.

For retaining the outer cover member 17 on the wheel, the tire rim is provided with inter-engaging means in the form of cover retaining bumps 24 which are pressed-in to project radially inwardly in the base flange 9 of the tire rim adjacent juncture thereof with the side flange 10. Preferably there are a plurality of the retaining bumps 24 provided equidistantly spaced circumferentially about the tire rim flange 9, herein four of such bumps being provided. Herein the terminal bead 23 projects to a diameter that is larger than the diameter described about the tips of the retaining bumps 24. Accordingly, the terminal bead 23 is adapted to be pressed into snap-on engagement behind the bumps 24 by camming over the axially outer sides of the bumps into engagement with the generally axially and radially inwardly facing shoulders provided by the bumps. Furthermore, the spacing of the shoulders of the bumps from the seat provided by the opposing edge of the wheel body marginal flange 8 is such that when the inner cover bead 20 is resting on the body flange edge and the outer cover member bead 23 has been snapped behind the bumps, the bead 23 will thrust firmly against the bead 20 and thereby clamp it snugly against the edge of the flange 8. By the same token, the bead 20 holds the outer cover member bead 23 firmly against the shoulders of the retaining bumps 24. Hence, the two confronting mutually thrusting beads 20 and 23 in engagement with the respective wheel parts, retain the cover members in effectively rattle free seated relation on the wheel.

It will be observed that the maximum diameter of the inner cover member bead 23 is at least slightly greater than the diameter described about the tips of the retaining bumps 24 so that initial application of the inner cover member 15 can be effected by snapping it inwardly past the beads 24 and it will be held in place thereby, although loosely, until the outer annular cover member 17 has been pressed axially inwardly into position on the wheel.

It will further be observed that when the cover members are in assembly with respect to one another that the inner cover member and more particularly the marginal flange portion 19 extends generally at right angles to the area of engagement between the terminal portion 23 of the outer cover member and the bumps 24 provide a rigid back-up to resist displacement of the outer cover member from the wheel. It will be further observed that when the cover members are in assembly upon the wheel that the bead 20 is maintained in radially spaced relation with respect to the base flange 9 of the tire rim.

A valve stem aperture 25 may be provided in the outer annular cover member 17 for projection therethrough of the valve stem 14.

To remove the cover from the wheel, the radially outer cover member 17 may be pried free from the bumps 24 by insertion of a suitable pry-off tool such as a screwdriver or the like behind the outer margin thereof, that is, behind the turned edge 21 and pry-off leverage applied thereto by fulcruming of the tool against the tire rim. When the outer cover member 17 has been removed, then the inner cover member will be unlocked, from the locked relationship in which it is held by the outer cover member, and can also then be removed.

It will be understood that modifications and variations may be effected without departing from the scope of the novel concepts of the present invention.

I claim as my invention:

1. In a wheel structure including a wheel body and a tire rim, the wheel body having a dished outer margin with a generally axially outwardly extending annular flange attached to the tire rim and providing an annular outwardly projecting seat, the tire rim having retaining bumps thereon adjacent to and in axially outwardly spaced relation from but opposing the edge of said flange, and a cover for disposition at the outer side of the wheel including an inner cover member having a terminal edge portion for seating on the edge of said flange, and a circular outer cover member having an edge portion for engagement behind the retaining bumps and to seat on the edge portion of the inner cover member and lock it in place.

2. In a wheel structure including a wheel body and a tire rim, the wheel body having a dished outer margin with a generally axially outwardly extending annular flange attached to the tire rim and providing an annular outwardly projecting seat, the tire rim having retaining bumps thereon adjacent to and in axially outwardly spaced relation from but opposing the edge of said flange, and a cover for disposition at the outer side of the wheel including an inner cover member having a terminal edge portion for seating on the edge of said flange, and a circular outer cover member having an edge portion for engagement behind the retaining bumps and to seat on the edge portion of the inner cover member and lock it in place, said edge portions being annular turned respective beads disposed in confronting relation in the assembly.

3. In a wheel structure including a wheel body and a tire rim having confronting axially spaced cover engageable portions thereon, a multi-part cover construction including a pair of interengageable detachable cover members for covering disposition over the outer side of the wheel having independent confronting axially abutting portions thereon respectively engageable retainingly between said confronting portions of the wheel body and tire rim for retaining the cover members in assembly on the wheel, said cover members being overlapped in assembly with the axially innermost cover member being maintained in assembly radially spaced from the tire rim and bottomed against the body part confronting portion under tension by the confronting portion of the axially outer cover member.

4. In a wheel structure including a wheel body having an outer dished annular marginal portion with a generally axially outwardly directed annular attachment flange and a tire rim having a base flange to which said attachment flange is secured with the outer edge of said attachment flange spaced from the axially outer extremity of said base flange, said base flange having spaced axially outwardly from the edge of said attachment flange and confronting the same cover retaining means, and a multi-part cover construction for retained engagement between said means and said attachment flange edge with a portion of one of said cover parts being deeply dished and in assembly being housed in said outer dished annular marginal portion.

5. In a wheel structure including a wheel body and a tire rim, with a portion of the wheel body contiguous a base flange of the tire rim and spaced axially inwardly from the outer extremity of said tire rim base flange, said base flange having retaining bumps thereon spaced axially outwardly from said portion of the wheel body, and a pair of inner and outer cover members having respective confronting annular terminal portions respectively and each independently engageable with said wheel body portion and with said retaining bumps and mutually thrusting against one another whereby to retain the cover members on the wheel, said terminal portion on the inner cover member having a cover area disposed axially inwardly behind the bumps and extending at generally right angles to the area of engagement between the terminal portion of the outer cover member and the bumps to provide a rigid back-up to resist displacement of the outer cover member from the wheel.

6. In a wheel structure including a wheel body having an outer annular inwardly deeply dished portion providing an axially outwardly opening groove defined at its radially outer side by a generally axially outwardly directed attachment flange and a tire rim having a base flange engaged by said attachment flange, said tire rim having inwardly projecting retaining means confronting said attachment flange in spaced relation, and a cover assembly for the outer side of the wheel including an inner cover member for overlying the wheel body and having an outer deeply dished marginal portion to extend into said groove and provided with a generally axially outwardly directed flange with a terminal portion thereof for seating on said attachment flange, and a circular outer cover member for overlying the tire rim and having an inner margin engaged by said retaining means on the tire rim and thrusting retainingly against the margin of said inner cover member.

7. In a wheel structure including a wheel body and a tire rim, the wheel body having a dished outer margin with an annular flange attached to the tire rim and having an annular outwardly projecting seat, the tire rim having retaining bumps thereon adjacent to and in axially outwardly spaced relation from but generally opposite said seat, and a cover structure for disposition at the outer side of the wheel including an inner cover member and a circular outer cover member, said inner cover member having a terminal edge portion for seating on said seat, said circular outer cover member having an edge portion for engagement behind the retaining bumps only after the terminal edge portion of the inner cover member has been disposed between the seat and the bumps with the terminal edge portion in abutting engagement against the edge portion to seat the edge portion of the inner cover member against the seat and lock it in place.

8. In a wheel structure including a wheel body and a tire rim, the wheel body having a dished outer margin with an annular flange attached to the tire rim and having an annular outwardly projecting seat, the tire rim having retaining bumps thereon adjacent to and in axially outwardly spaced relation from but generally opposite said seat, and a cover structure for disposition at the outer side of the wheel including an inner cover member having a terminal edge portion for disposition between said seat and said bumps, said circular outer cover member being assembled with the wheel only after the inner cover member has been assembled with the wheel and with the outer cover member having an edge portion for engagement behind the retaining bumps and to seat on the edge portion of the inner cover member and lock it in place, each of said edge portions comprising annular beads for endwise abutting engagement together between said seat and said bumps.

9. In a wheel structure including a wheel body having an outer annular inwardly deeply dished portion providing an axially outwardly opening groove defined at its radially outer side by an attachment flange, including a seat on said body and a tire rim having a base flange engaged by said attachment flange, said tire rim having inwardly projecting retaining means confronting said seat in spaced relation, and a cover assembly for the outer side of the wheel including an inner cover member for overlying the wheel body and having an outer deeply dished marginal portion to extend into said groove and provided with a generally axially outwardly directed flange with a terminal portion thereof for seating on said seat, and a circular outer cover member for overlying the tire rim and having an inner margin engaged by said retaining means on the tire rim and thrusting retainingly against the margin of said inner cover member.

10. In a wheel structure including a wheel body having an annular inwardly deeply dished portion providing an axially outwardly opening groove and having a bottoming shoulder adjacent thereto and having retaining means confronting said bottoming shoulder in spaced relation, and a cover assembly for the outer side of the wheel including an inner cover member for overlying the wheel body and having a deeply dished portion to extend into said groove and provided with a flange portion thereof for retained engagement behind said retaining means and a circular outer cover for overlying the tire rim and having a flange portion retainingly engaged behind said retaining means with flange portions thrustingly bottomed on said bottoming shoulder in retained assembly.

11. In a wheel structure having rim and body parts with one of the parts including an annular generally radially facing portion and the other of said parts having a shoulder area axially inwardly from the axially outer side of said portion with cover retaining means disposed in confronting relation to said shoulder, a multi-part cover including a pair of mutually independent inner and outer circular members which are at all times entirely independent of one another except when they are assembled on a wheel together and with the members having confronting marginal portions for retained engagement between said shoulder and said retaining means, and with said marginal portion held centered relative to the wheel by said radially facing wheel portion.

12. In a wheel structure having rim and body parts with one of the parts including an annular generally radially facing portion and the other of said parts having a shoulder area axially inwardly from the axially outer side of said portion with cover retaining means disposed in confronting relation to said shoulder, a multi-part cover including a pair of mutually independent inner and outer circular members which are at all times entirely independent of one another except when they are assembled on a wheel together and with the members having confronting marginal beads maintained in mutually thrusting relation between said shoulder and said retaining means and held centered on the cover by said radially facing wheel portion.

References Cited in the file of this patent
UNITED STATES PATENTS

| | | |
|---|---|---|
| 2,239,366 | Lyon | Apr. 22, 1941 |
| 2,368,239 | Lyon | Jan. 30, 1945 |
| 2,368,249 | Lyon | Jan. 30, 1945 |